ns

Dec. 20, 1927

1,653,123

UNITED STATES PATENT OFFICE.

MAHLON J. RENTSCHLER, OF WILLOUGHBY, OHIO, ASSIGNOR OF ONE-THIRD TO WILLIAM R. JEAVONS, OF CLEVELAND HEIGHTS, OHIO, AND ONE-THIRD TO ALBERT N. JEAVONS, OF MENTOR, OHIO.

REFRACTORY BODY AND PROCESS FOR PRODUCING THE SAME.

No Drawing. Application filed December 13, 1920. Serial No. 430,307.

This invention relates to the production of refractory bodies such as are suitable for the construction of saggers, crucibles, linings for furnaces, firebrick etc.

Clay has been recognized and used as a desirable ingredient of such bodies, but its field of use is limited because of its inability to withstand high temperatures without disintegration. Hence carbon has been added to the clay for the purpose of strengthening the bodies formed therefrom and of rendering them resistant to high temperatures. However, the use of carbon in connection with such refractory bodies has been subject to the disadvantage that, when the bodies are heated in an oxidizing atmosphere, as by furnace gases or other products of combustion, the carbon content is rapidly consumed, leaving a siliceous porous skeleton. Where the bodies are formed into containers, this destruction of the carbon content necessarily renders them worthless for the purpose of heating any material therewithin and particularly where the material must be protected from an oxidizing atmosphere.

In order to prevent this destruction of the carbon content, refractory containers and their contents have been heated in muffle furnaces, electric furnaces, or reducing furnaces. As is well known, an electric furnace is seldom available, and it is frequently not adapted for the treatment of the particular contents of containers. Muffle furnaces are open to the objection that they are very wasteful of fuel and are frequently incapable of realizing the temperature required for a particular heat treatment; while reducing furnaces must be operated under conditions demanding a large excess of fuel throughout all stages of the firing. This results, not only in a great waste of fuel, but in making it well nigh impossible to obtain the requisite high temperatures under reducing conditions.

By means of my invention I am enabled to produce refractory bodies which are capable of withstanding high temperatures throughout prolonged use and irrespective of whether they are employed under oxidizing or reducing conditions. Furthermore, I am enabled to produce such bodies at a cost very much lower than has heretofore been required for the production of those of inferior efficiency. In general, the refractory bodies will be prepared in the same manner, irrespective of their intended use, the materials being molded or shaped, while in a plastic condition, to adapt them for containers, furnace linings, firebrick, etc. Hence, it will be understood that, in describing the preparation of a special body, I am not limiting the invention herein to the production of such articles. As the invention has proven of great efficiency in the production of saggers, it will be set forth specifically in connection with the production of a body of this particular character.

In the production of such an article, I first make a mixture of clay and carbon. Coke is crushed to produce particles of a maximum size of a navy bean, and these particles and all of the smaller particles incidental to such crushing will preferably be used. The carbon particles will constitute from 10% to 50% by weight of the total weight of the clay constituents, dependent upon the particular article to be produced. In the case of saggers, the carbon will constitute about 30% by weight of such constituents. The carbon particles will be pugged with the clay and water, making an intimate mixture, wherein the clay forms a coating for the carbon particles as well as a filling for the interstices between said particles. The larger carbon particles give physical strength to the completed body, while the presence of the smaller particles insures a more equal distribution of carbon throughout the body and the presence of carbon in all parts of the clay constituent thereof.

By using about 30% by weight of carbon (coke) there will be sufficient carbon to provide a substantially continuous body of carbon particles coated with clay, which will greatly increase the resistance of the composite clay-carbon mass against breaking down under high temperatures and will ensure the formation of a particularly efficient glaze with the composition to be set forth hereinafter. On the other hand, the clay will be present in such proportion as to enable the clay-carbon mixture to be molded and to afford a surface to which the glaze will adhere—the carbon alone presenting no such surface. With a green or unburned body formed from a mixture of clay and carbon in the manner described, I employ a glaze composition the ingredients of which are capable of co-operation with the carbon content of the body and with each other and, I believe, with the silicates of the clay to produce a glaze which will prevent the oxidation of the carbon content of the body by furnace and other gases and which will remain permanent under all ordinary ranges of temperature to which such bodies are subjected. For the purpose of forming my glaze, I mix together the following ingredients:

| | Parts. |
|---|---|
| Fire clay | 30 |
| Whiting | 20 |
| Sand | 35 |
| Sodium (or other alkali) silicate (40 degrees) | 15 |
| Feldspar | 50 |
| Water | 50 |

The ingredients are thoroughly mixed and the composition prepared therefrom allowed to stand for about three days, after which, in the case of saggers or other containers, it is applied to the outside, only, of the green or unburned bodies, as by means of a brush. I then burn the bodies and their coatings. When heated to a temperature of approximately 1900 degrees F., calcium and sodium (or other alkali) silicates begin to form and the coating begins to fuse. It is preferable to heat the body and its coating to a temperature of about 2200° F. and to continue heating at this temperature for such time as will complete the fusion of the glaze ingredients and enable the glaze thus formed to distribute itself uniformly over the entire exterior of the body, covering the pores thereof. When the glaze compound has been thus completely fused and uniformly distributed, the temperature may and preferably will be raised to about 2600° F., which will cause volatilization of the sodium or other alkali constituent of the composition, leaving a glaze coating consisting essentially of aluminum and calcium silicate of a high fusing point and having suspended therein particles of carborundum (silicon carbide). At the end of the firing operation the glaze appears to have amalgamated with the material of the body, as it not only covers but merges with such body. The glaze thus formed is capable of protecting the carbon constituent of the refractory body or container against oxidizing fuses acting upon the glazed side up to any ordinary commercial temperatures; it will also protect such a container and the contents thereof against chemical action generally, such as oxidation, hydration and sulphurization.

During the burning of the mixture of clay and carbon, with the glaze composition thereon, some carbon dioxide is evolved which permeates the mass of clay and the carbon and is dissociated, depositing carbon upon and within the various ingredients of which the body is composed. At any rate, when the body thus burned is broken, its fracture is of a uniformly dark and carbonaceous appearance throughout its extent, and the effect of preparing and burning the ingredients in the manner described is to produce a body in which the carbon necessary to preserve the clay from disintegration permeates the entire mass of the latter, itself being protected from destruction by furnace and other oxidizing gases by a particularly efficient glaze. Where the body is made into a container, such as a sagger, the carbon constituent is not only protected against oxidation, but serves to maintain a reducing or neutral atmosphere within the interior of such container. Because of this capability, containers constructed in accordance with my invention have been found particularly efficient in the manufacture of barium oxide wherein it is an absolute necessity that the barium carbonate within the container shall be at least in a neutral or non-oxidizing atmosphere.

Reference has been made to the presence of carborundum or silicon carbide in the glaze coating. It is believed that this is produced by a combination between a part of the silicon in the glaze composition and a part of the carbon in the body to which the composition is applied. At any rate, an analysis of the final glaze shows that carborundum is disseminated therethrough in small particles and aids in forming a particularly high-resistant coating, which coating is also of an abrasive hardness. It is believed that the formation of this carbide is greatly facilitated by the use of the fine carbon particles uniformly distributed throughout the clay and in such close proximity as to enable chemical reaction between the glaze constituents and the carbon.

It will be understood that the ingredients and the proportions thereof for the production of the glaze are illustrative, the formula representing the preferred recipe for making such glaze. It is, however, possible to vary the proportions of the ingredients in such manner as to result in a variation in the melting or fusing point of the glaze. For instance, it is possible to omit the feldspar ingredient; to use other silicates than fire clay—for instance, kaolin; to use other forms of calcium carbonate than whiting; or, in fact, to employ in place of the same a carbonate of an alkaline earth; so also, other forms of silica than sand may be used; and, as pointed out, another alkali silicate may be used instead of silicate of soda. The water is added to the composition for the purpose of rendering the mixture suitable for spraying, dipping, or painting; and the quantity of water may be varied accordingly. When desirable, the dry glaze ingredients may be shipped to the place of use and the water added thereto as occasion may require.

Instead of using clay and carbon alone in the mixture for producing the unburned bodies, I may mingle with the clay and coke, particles of old, used refractory bodies produced in the manner above described, or particles of firebrick. When such firebrick or old bodies or containers are used, they will be crushed to about the size of the carbon particles and will be mixed with the new or unused clay and carbon in about the proportion of 30% by weight of such particles to 70% of the combined weight of the clay and carbon. Bodies or containers produced from this mixture are at least as strong as (if not stronger than) those produced from clay and carbon only; and, where the old used containers or bodies are available, what would otherwise be a waste product can be utilized to advantage and with great economy in the production of the new bodies or containers.

The use of carbon particles of a size varying as set forth hereinbefore has been found to be particularly beneficial in producing a body (and especially a container) having sufficient strength and heat-resistant qualities to render it capable of use for a longer period of time than any other similar body or container with which I am acquainted. Furthermore, it is not necessary to use any special grade of carbon, satisfactory bodies being produced by the use of ordinary coke breeze.

Having thus described my invention, what I claim is:

1. The process of forming refractory bodies which comprises pugging together a mixture of clay, carbon particles, and heat-resistant particles, shaping the resultant mixture to suitable form, drying the mass or body thus produced, applying to the exterior of such mass or body a composition capable, when burned, of forming therewith a gas-excluding glaze, and firing such mass or body.

2. The process of forming refractory bodies which comprises pugging together a mixture of clay, coke particles, and particles of previously burned heat-resistant material, shaping the resultant mixture to suitable form, drying the mass or body thus produced, applying to the exterior of such mass or body a composition capable, when burned, of forming therewith a gas-excluding glaze, and firing such mass or body.

3. The process of producing refractory bodies which comprises pugging carbon particles of varying size with clay, whereby the particles of carbon are intimately associated with each other and with such clay, shaping the mixture to suitable form, drying the mass or body thus produced, applying to such mass or body a coating capable of forming therewith, when burned or fired, a gas-excluding glaze, and firing such mass or body.

4. The process of producing refractory bodies which comprises pugging carbon particles with clay, whereby the particles of carbon are coated with such clay, shaping the mixture to suitable form, drying the mass or body thus produced, applying to such mass or body a coating capable of forming with the ingredients thereof, when burned or fired, a gas-excluding glaze, and firing such mass or body.

5. The process of forming refractory bodies which comprises molding an unburned body from a mixture of carbon particles of varying sizes with ceramic bonding material wherein the said particles of varying sizes are distributed uniformly throughout the body, drying the said body, applying to the body a coating capable of forming therewith, when burned or fired, a gas-excluding glaze, and firing such molded body.

6. The step in the process of producing refractory bodies containing carbon particles mixed with a ceramic bonding material which consists in burning the said bodies with an exteriorly applied composition capable of forming therewith a heat-resistant, gas-excluding coating.

7. The step in the process of producing refractory bodies containing carbon particles mixed with a ceramic bonding material which consists in burning the said bodies with an exteriorly applied composition capable of forming with one or more of the constituents of such bodies, by the burning operation, a glaze containing carbon and silicon united in the proportion expressed by the formula SiC.

8. The step in the process of producing refractory bodies containing carbon particles mixed with a ceramic bonding material which consists in burning the said bodies with an exteriorly applied composition capable of forming with the constituents of such bodies a siliceous glaze containing in suspension carbon and silicon united in the proportion expressed by the formula SiC.

9. A refractory body comprising a burned mixture of particles of coke of varying sizes mingled with particles of previously burned heat resistant material and with a ceramic bonding agent, the particles of coke and the particles of such previously burned material being uniformly disseminated throughout the resultant body and the said body having thereon a heat-resistant gas-excluding glazed coating.

10. A refractory body comprising a burned mixture of carbon with a ceramic bonding agent and having a heat-resistant, gas-excluding glaze coating on the exterior thereof.

11. A refractory body comprising a burned mixture of carbon with a ceramic bonding agent and having thereon a glaze coating of abrasive hardness and of high heat-resistant qualities.

12. A refractory body comprising a burned mixture of carbon and a ceramic bonding agent having thereon a glaze containing a composition of carbon and silicon united in the proportion expressed by the formula SiC.

13. A refractory body comprising a burned mixture of carbon with a ceramic bonding agent and having thereon a coating consisting of a vitreous glaze having suspended therein carbon and silicon united in the proportion expressed by the formula SiC.

14. A refractory body comprising a mixture of carbon with a ceramic bonding agent burned with a coating capable of producing with the constituents of said body a vitreous glaze containing carbon and silicon united in the proportion expressed by the formula SiC.

15. A refractory body comprising a burned mixture of carbon and a ceramic bonding agent having thereon a glaze of mixed silicates containing in suspension carbon and silicon united in the proportion expressed by the formula SiC.

In testimony whereof, I hereunto affix my signature.

MAHLON J. RENTSCHLER.